US012383992B2

(12) United States Patent
Hansen

(10) Patent No.: US 12,383,992 B2
(45) Date of Patent: Aug. 12, 2025

(54) HEATER BOX REPAIR APPARATUS AND METHOD OF USE

(71) Applicant: Nathaniel Bruce Hansen, Idaho Falls, ID (US)

(72) Inventor: Nathaniel Bruce Hansen, Idaho Falls, ID (US)

(*) Notice: Subject to any disclaimer, the term of this patent is extended or adjusted under 35 U.S.C. 154(b) by 0 days.

(21) Appl. No.: 18/817,536

(22) Filed: Aug. 28, 2024

(65) Prior Publication Data

US 2024/0416467 A1    Dec. 19, 2024

Related U.S. Application Data

(63) Continuation-in-part of application No. 18/594,572, filed on Mar. 4, 2024, now Pat. No. 12,103,502.

(60) Provisional application No. 63/452,529, filed on Mar. 16, 2023.

(51) Int. Cl.
*B23P 6/00*     (2006.01)
*B60H 1/00*     (2006.01)

(52) U.S. Cl.
CPC .......... *B23P 6/00* (2013.01); *B23P 2700/50* (2013.01); *B60H 2001/00092* (2013.01)

(58) Field of Classification Search
CPC .. B23P 6/00; B23P 2700/50; Y10T 29/49718; Y10T 29/49721; Y10T 29/4973; B62D 65/00; B62D 65/02; B60H 2001/00078; B60H 2001/00092
See application file for complete search history.

(56) References Cited

U.S. PATENT DOCUMENTS

2023/0286350 A1*  9/2023  Canato ................. B60H 1/3414

OTHER PUBLICATIONS

John (YouTube username); "Blend Doors and Evaporator Replacement—Part 2, Rebuild"; published Jun. 3, 2016; YouTube; https://www.youtube.com/watch?v=_sRvLSDALLc (Year: 2016).*
HammerWrench Renovations (YouTube username); "Nissan Rogue pt. 2—No Heat, but blend door stepper motor is good."; published Jan. 26, 2023; YouTube; https://www.youtube.com/watch?v=XBlmdJYSBMo (Year: 2023).*
Blend Door USA; "4th Gen Ram (09-19) Complete Repair Kit"; available 2019 (based on earliest customer review); https://www.blenddoorusa.com/collections/4th-gen-09-ram-truck/products/4th-gen-ram-09-with-single-zone-climate-control-complete-kit (Year: 2019).*

* cited by examiner

*Primary Examiner* — Matthew P Travers

(57) ABSTRACT

A heater box apparatus may include a shaft member and a gear member. The gear member may include one or more protrusions, with a first and a second protrusion being on a first side of the gear member and a third protrusion being on a second side of the gear member. The third protrusion may include an aperture configured to receive the shaft member. The shaft member may include a first shaft portion, a second shaft portion, and a hood that separates the first shaft portion from the second shaft portion. The hood may circumscribe an outer edge of a new, enlarged, or broken vehicle door bore, the door bore couples to the airflow doors, which directs airflow between hot and cold.

19 Claims, 16 Drawing Sheets

HEATER BOX REPAIR APPARATUS AND METHOD OF USE

CROSS-REFERENCE TO RELATED APPLICATIONS

This a continuation-in-part of U.S. Non-Provisional patent application Ser. No. 18/594,572 filed on Mar. 4, 2024, which claims the benefit of U.S. Provisional Application Ser. No. 63/452,529, filed on Mar. 16, 2023, both of which are incorporated herein by reference.

TECHNICAL FIELD

The present disclosure relates to a heater box repair apparatus. More particularly, the present disclosure relates to a heater box repair apparatus that allows heater boxes in vehicles to function properly.

BACKGROUND

Vehicles have become an important part of society as they provide transportation for individuals and goods. Vehicles have been around for many years and continue to evolve in function, looks, and accessories. With all of these changes, there are often issues that arise in these vehicles. That is, vehicle updates often lead to unforeseen issues that have to be addressed with new components from the manufacturer or resolved through other means.

In particular, some vehicle models exhibit a problem with the heater and air conditioner due to faulty manufacturer parts. All too often these faulty parts are not corrected year after year for a given vehicle model. Therefore, consumers are left to purchase extremely expensive replacement parts provided by the car manufacturer, which often leads to unnecessary financial burdens on the consumer.

Accordingly, there is a need for an apparatus and a method of installing the apparatus that allows a vehicle's heating and air conditioning mechanisms to function properly. The present invention seeks to solve these and other problems.

SUMMARY OF EXAMPLE EMBODIMENTS

In one embodiment, a method of configuring a heating box shaft includes, generally, removing a gear and shaft from a first door actuator (e.g., motor and motor housing) found in a heater box housing; removing a gear and shaft from a second door actuator; cutting the shaft from the gear from the first door actuator; coupling the cut shaft to the gear and shaft from the second door actuator so as to extend the length of the shaft; inserting the coupled shaft and gear into the first and/or second door actuator housing; and inserting and fastening the coupled shaft, in the first and/or second door actuator to a door bore in a vehicle.

In one embodiment, a heater box apparatus includes a gear member and a shaft member. The gear member may comprise a first, circular member having a plurality of gear teeth. A disc panel may be positioned within the first member, the disc panel being perpendicular to the first member. On a first side of the disc panel, there may be one or more tiered first protrusions. Accordingly, a first protrusion may extend from the first side of the disc panel. Extending from the first protrusion may be a second protrusion. On the second side of the disc panel, a third, shaft protrusion may extend therefrom. The third protrusion may comprise a second aperture.

The shaft member may be removably attachable to the gear member. The shaft member may comprise a first portion, a second portion, and a hood that separates the first portion from the second portion. The hood may be generally circular in shape so as to match the shape of a door bore. The hood proximate the first portion may be substantially flat, while the hood proximate the second portion may comprise a lip that circumscribes an outer edge of the hood. Due to the hood having a lip, the hood generally includes a recessed portion positioned between the lip and the second portion of the shaft member that surrounds the second portion.

In one embodiment, a heater box apparatus includes a gear member and a shaft member. The gear member may be circular in shape and comprise a first, circular member having a plurality of gear teeth. A disc panel may be positioned within the first member. On a first side of the disc panel, there may be tiered protrusions. Accordingly, a first protrusion may extend from the first side of the disc panel. The first protrusion may comprise first protrusion apertures. Extending from the first protrusion may be a second protrusion. On a second side of the disc panel, a third protrusion may extend therefrom. The third protrusion may include a first shaft.

The shaft member may be removably attachable to the gear member. The shaft member may comprise a first portion and a second portion. The first portion may comprise a hood. A shaft receptacle may run the length of the shaft member and be configured to receive the first shaft. The hood may be generally circular in shape so as to match the shape of the door bore. The hood may be substantially flat. The hood may comprise a lip. Proximate the second portion, the lip circumscribes an outer edge of the hood. Due to the hood having the lip, the hood generally includes a recessed portion positioned between the lip and the second portion of the shaft member that surrounds the second portion. The second portion may be placed in the door bore.

In one embodiment, a gear member may be circular in shape and comprise a first, circular member having a plurality of gear teeth. A disc panel may be positioned within the first member, the disc panel being perpendicular to the first member. On a first side of the disc panel, there may be tiered protrusions. Accordingly, a first protrusion may extend from the first side of the disc panel. The first protrusion may comprise first protrusion apertures. Extending from the first protrusion may be a second protrusion. On a second side of the disc panel, a third protrusion may extend therefrom.

In one embodiment, a method of repairing a heater box with the heater box repair apparatus includes the following steps: remove entire door actuator from a heater box and, in some embodiments, separate the two halves of the door actuator housing; remove a gear member and a shaft member from its packaging; apply a predetermined amount of lubricant to the gear member; remove a preexisting gear from the door actuator housing and discard; install the heater box repair apparatus; ensure all parts are in the door actuator housing and reconnect housing; clean the door bore; clean shaft member and temporarily place shaft member into door bore for test fitting; apply an activator; and remove shaft member and add the adhesive to the door bore; insert the shaft member into the door bore; and fasten the door actuator housing to the heater box.

DETAILED DESCRIPTION OF EXAMPLE EMBODIMENTS

Figure 1:
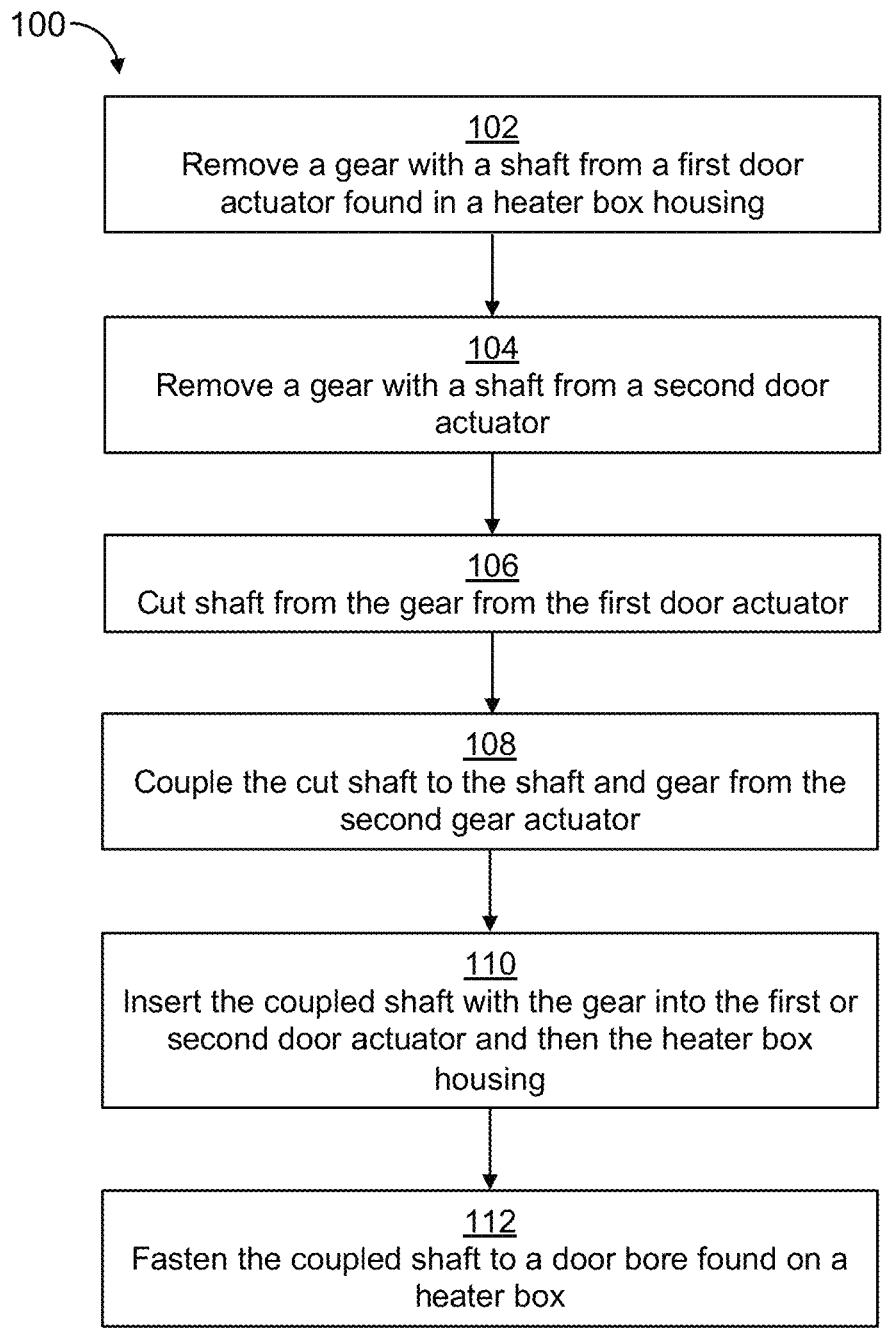
FIG. 1 illustrates a flow chart of a heater box repair apparatus and method of use.
Figure 2:
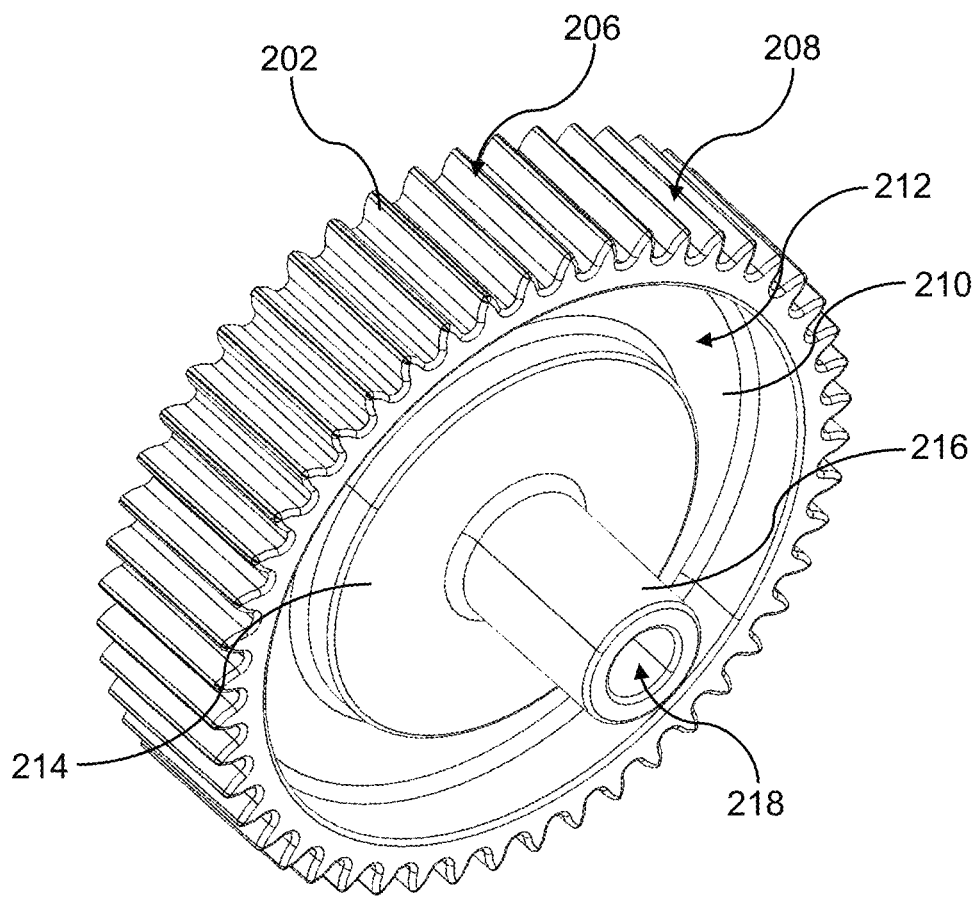
FIG. 2 illustrates a front, side perspective view of a gear member of a heater box repair apparatus.
Figure 3:
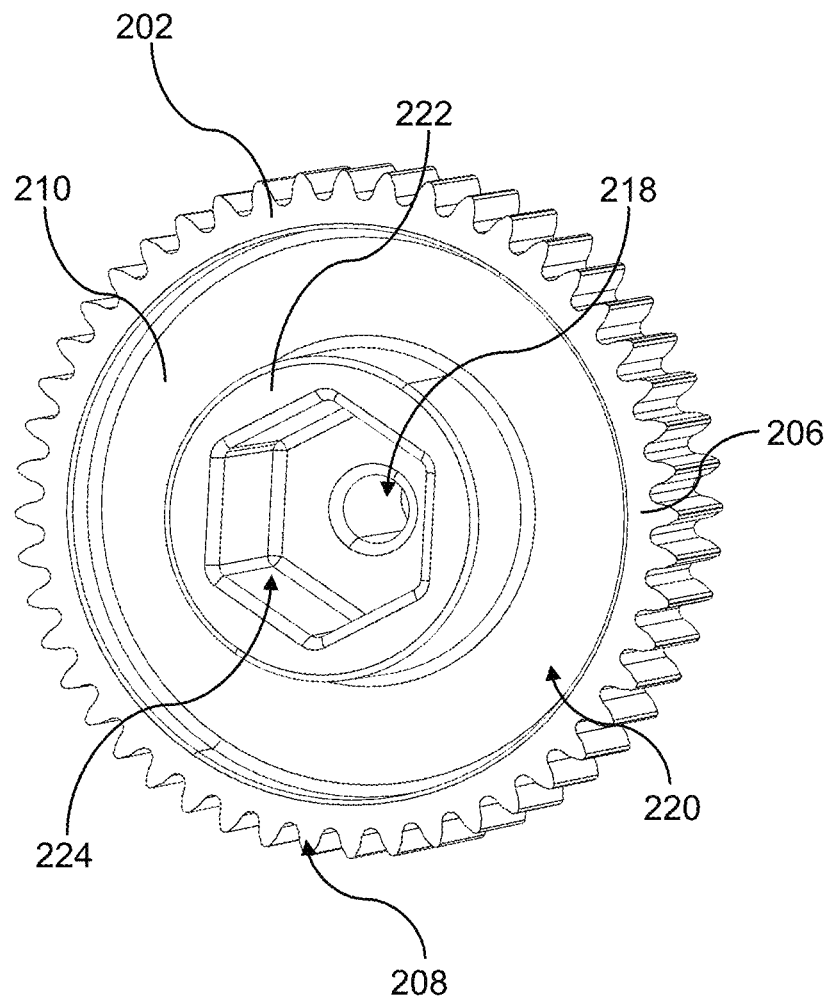
FIG. 3 illustrates a rear perspective view of a gear member of a heater box repair apparatus.
Figure 4:
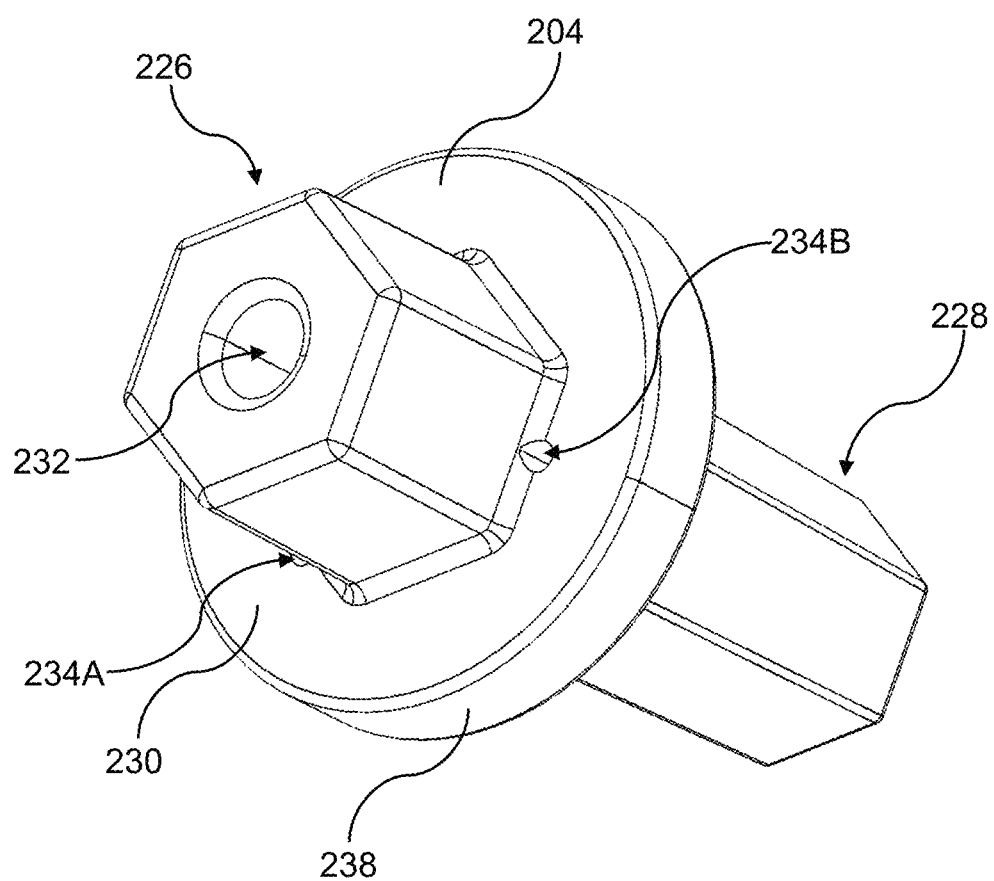
FIG. 4 illustrates a front, side perspective view of a shaft member of a heater box repair apparatus.
Figure 5:
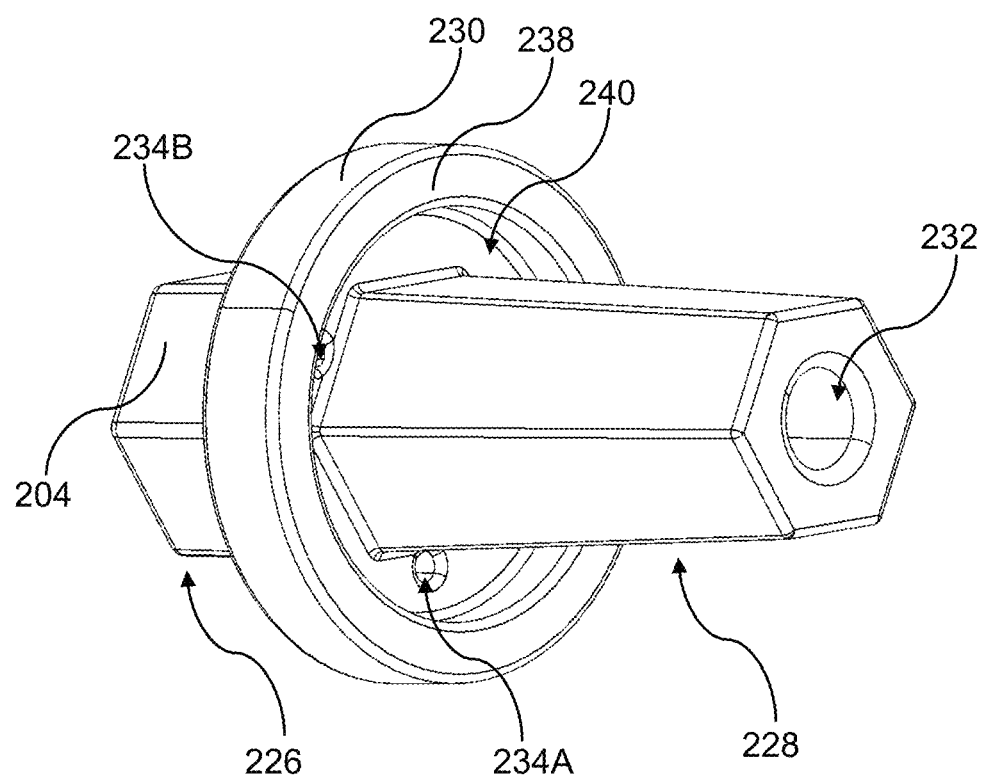
FIG. 5 illustrates a rear, side perspective view of a shaft member of a heater box repair apparatus.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

It will be understood that the detailed description depicts only example embodiments, which are not to be considered limiting in scope. Reference to the invention, the present disclosure, or the like are not intended to restrict or limit the invention, the present disclosure, or the like to exact features or steps of any one or more of the exemplary embodiments disclosed herein. References to "one embodiment," "an embodiment," "various embodiments," and the like, may indicate that the embodiment(s) so described may include a particular feature, structure, or characteristic, but not every embodiment necessarily includes the particular feature, structure, or characteristic. In addition, repeated use of the phrase "in one embodiment," or "in an embodiment," do not necessarily refer to the same embodiment, although they may refer to the same embodiment.

The particular arrangements disclosed herein are meant to be illustrative only and not limiting as to the scope of the invention. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described.

It will be understood that the steps of any such processes or methods are not limited to being carried out in any particular sequence or arrangement. In fact, the steps of the disclosed processes or methods generally may be carried out in various different sequences and arrangements while still falling within the scope of the present invention.

The terms "comprising," "including," "having," and the like, as used with respect to embodiments, are synonymous, and are generally intended as "open" terms.

As previously described, there is a need for an apparatus and a method of installing the apparatus that allows a vehicle's heating and air conditioning mechanisms to function properly. The present invention seeks to solve these and other problems.

Some vehicles have a case assembly secured to the firewall of the vehicle. This case is commonly referred to as the "heater box." This heater box is located on the firewall of the vehicle behind and under a visible dashboard assembly. The heater box is a housing that contains the heat and air conditioning exchangers, (heater core and evaporator core), the blower fan to generate airflow, and the mechanisms for directing the airflow in a vehicle. The heater box is responsible for directing the air from recirculate to outside air and also for all the modes including defrost, dash vents, floor vents, and so forth. In addition, the heater box allows for temperature mixing of the airflow to provide a desired air temperature in the vehicle for passenger comfort. This is achieved in a common fashion by employing the use of moveable or swinging doors to open or block certain pathways for the airflow. The swinging doors are manipulated by small servos, or stepper motors, commonly referred to as door actuators. The door actuators can position the doors in the heater box in many, different configurations to achieve desired results. The door actuators are monitored and controlled by a computer module commonly known as the HVAC module or AC computer.

Upon actualization, triggered by a power reset or diagnostic command or other such event, the HVAC computer actualizes the door actuators to a hard stop in both directions, meaning that the door actuators are active until they are forced to stop moving due to the mechanical travel limits of the swinging doors. The doors are then commanded to travel in the same manner in the opposite direction. This procedure allows the HVAC computer to learn the mechanical travel limits of the doors in order to facilitate proper positioning of the doors. This actualization door learning procedure can also put added stress on the mechanical portions of the door actuators, doors themselves, and the heater box.

Many vehicles employ stepper motors as door actuators with a protruding hexagonal shaft. The shaft extends from the body of the stepper motor and the entire assembly is made of plastic, such as nylon, polyethylene, metal, or some combination thereof. Each stepper motor assembly attaches to the heater box by mating to a matching location and is secured with fasteners (e.g., two metal screws) designed for use in plastic and one locating tab. The hexagonal shaft of the stepper motor assembly extends into a hole in the heater box. A shaft which contains a matching hexagonal bore rotates freely within the hole in the heater box. This shaft is attached to a swinging door. Thus, when the stepper motor rotates the hexagonal shaft, the door movement is achieved through this connection. A major issue lies within the design of the protruding shaft on the stepper motor. While the motor is attached to the heater box, the shaft only extends partially into the corresponding bore. The shaft and bore do not have enough contact, making a weak point in the system. Where the protruding shaft contacts the bore, the bore often is stripped out and becomes enlarged and/or forms a crack. The bore is sometimes enlarged due to the pressure from the rotation of the shaft leading to abrasion.

Therefore, when the stepper motor is activated, the hexagonal shaft will rotate without a strong enough mechanical connection to the heater door and the heater door will not rotate or will not rotate far enough to accomplish its design of directing the airflow within the heater box. The most common failure point is often at the left temperature blend door. When the solid motor to door connection is lost, the door may rest in the cold air position with little heat being directed out of the vents to the driver side of the vehicle when heat is selected. It can also cause the HVAC module to diagnose a fault in the left blend door actuator electrical circuit or control and cease any movement of the door actuator resulting in the same condition. This can make the vehicle very uncomfortable to drive in cold ambient temperatures and dangerous due to a lack of defroster operation for the windshield. Transversely the door may be rested in the heat position and provide hot air when cold air is selected. In this case, the left side of the vehicle cabin would be receiving hot air or both sides if the vehicle has only single temperature controls versus dual zone temperature controls. Very hot ambient temperatures can be uncomfortable for the driver and/or passenger of the vehicle.

Additionally, replacement of the entire heater box assembly is a very intrusive repair. So many systems and components are removed or rearranged, such as the steering column. Possibilities of errors or omissions can be high. Loose or forgotten fasteners create noise and safety hazards. The fragile steering column can be damaged easily. Wiring can be crushed or routed improperly causing short and open circuits. This replacement can also be costly to diagnose and repair. Cosmetic damage to the dashboard and other trim pieces is common with such invasive repairs, which further adds to the cost of the repair.

To address this issue, the manufacturer may provide a repair solution through a dealership. The repair involves replacement of the entire heater box with an assembly of the same design as the original. Individual heater doors and other similar parts in the heater box are not available to consumers. The heater box is very expensive and is very labor intensive to replace, as discussed above. Cost estimates for repairs are usually thousands of dollars. Independent shops can also obtain the part from the manufacturer but are still faced with high labor costs and high costs for purchasing a heater box assembly which is only available from the manufacturer. Another problem is that even after the expensive repairs are made, the same possibility for failure exists. Many vehicle owners opt to sell the vehicle when this problem occurs, but the resale value is significantly lower due to the cost of the repairs.

The apparatus and method discussed herein provides for minimal disassembly and disturbance of the vehicle. The heater box repair apparatus described herein includes a design improvement to strengthen the connection between the door actuator and the heater door. In particular, the apparatus may be designed to increase the strength of the connection between a shaft and a door bore of the heater box. That means that the shaft on a stepper motor can be extended and contact the undamaged portion of the bore, having a greater contact surface area than the original manufacturer part. The extended shaft may be adhered to the bore to ensure a functioning connection. By removing the stepper motor (i.e., door actuator) and harvesting parts from it, a user can modify a new replacement part with a new, longer shaft. Other embodiments discussed herein may include a gear member and a shaft member that function in tandem to solve the issues described above. It will be appreciated that the added robustness of the design allows for longer service life of the components and may increase the lifespan of the heater box allowing for the vehicle occupants to enjoy a comfortable vehicle cabin temperature, without worrying about expensive costs related to the heater. This also solves the cost problem by potentially saving thousands of dollars. In addition, the repair saves not only money for an individual but also time due to the shortened time to install the shaft. This means that instead of waiting, for example, weeks to receive the fixed vehicle, an individual may only have to wait a day or two to receive the vehicle.

The issue may also be addressed by including a gear member and a shaft member, described herein, that both interact with a door bore (i.e., a bore that is integrated into the swinging doors that determine whether hot or cold air is leaving the vehicle vents), and that couples to the swinging door and a door actuator and a door actuator housing. The gear member and the shaft member may replace the original gear and shaft and be configured to address the issues with the door bore, such as the cracking and/or enlargement of the door bore.

In one embodiment, a heater box apparatus may include one or more shafts (e.g., an approximately 10 mm long approximately 8 mm diameter shaft) that is comprised of a nylon plastic material; however, other types of material may be used without departing herefrom. Some of these other materials may include metal, plastics, fiberglass, etc. The shaft may be hexagonally shaped, or in some embodiments, triangular, quadrangle, or any other shape. The shaft may protrude from a housing. In some embodiments, the housing may be approximately 67 mm by 44 mm and about 35 mm high. The housing may include a 12v DC electric motor, gears, and a circuit board, which creates the heater door actuator. The housing may be opened by releasing retaining tabs so as to allow two parts (i.e., halves) of the housing to be separated. The gear that is formed with the shaft is then removed. The gear with the shaft is removed both in old and new door actuator housings. The shaft on the original part may be cut off with, for example, a rotary cutter, or other cutting device. It is then fitted onto a first shaft from the new, or old, part with a fastener. A cleaner may be used to clean the shafts of grease or oil. A hot foot plastic welder and a heat gun may then be used to heat and form a bevel where the first and a second shaft meet. Nylon plastic welding rod is then used to form a weld and permanently join the first and second shafts. After cooling, the rotary tool and a file may be used to shape the weld joint down to the original size of the, for example, hexagonal shafts.

The gear with the extended shaft (i.e., the first and second shafts coupled together) is cleaned and re-greased. The gear with the extended shaft is inserted back into the door actuator. In some embodiments, a metal replacement piece or tool that has sharp protrusions that would be heated and then inserted into the heater door to melt and form a new bore shape could be used with a different style door actuator. In some embodiments, a modification to the door actuator that comprises a pass-through hole that could utilize a fastener to form a solid attachment to the heater door could be used. In other embodiments, a user could make a metal cap that would fit tightly over the original door actuator and then fit tightly into the damaged bore. In other embodiments, a user could make a cap that would attach to the door actuator with a fastener that would extend the shaft length.

Further, the door actuator may have an approximately 8 mm diameter shaft that is about 9 mm long with a slight taper that extends slightly further. This shaft fits into a matching approximately 8 mm bore that is slightly larger to accommodate the shaft. It will be appreciated that the farther the extended shaft protrudes into the bore at its capped end, the stronger the connection and less likely that the extended shaft will experience failure. The depth of the bore is about 19 mm. The first approximately 7 to 8 mm, for example, of the bore gets damaged and stripped out so that the hexagonal shape becomes rounder and more enlarged. Engagement with the shaft is then compromised and the bore will not be rotated by the shaft. Accordingly, once the extended shaft is prepared, the extended shaft may engage the full depth of the bore. Adding about 10 mm to the shaft but keeping the original shape and diameter with a taper, thereby creating the extended shaft. The shaft may be tapered. The extended shaft length may be about 19 mm. The extended shaft may, in some embodiments, be a different diameter and/or shape. In some embodiments, the extended shaft may be configured in such a way that the first 7 to 8 mm would be a larger diameter to accommodate the damaged bore. That larger diameter portion of the extended shaft could be shaped in a way to engage the damaged portion of the bore, or be shaped so as to allow re-shaping of the damaged portion of the bore. A tool for re-shaping the bore may include a metal piece that is heated and allows melting a shape into the bore. It may also be a tool that can engage a drill for rotary motion to cut or file the bore, or some sort of a blade or cutter that could engage a reciprocating tool. It could also be a hand operated unit that can cut into the bore. Any shaft design employed could be fastened to the bore through a mechanical means, such as a screw, rivet, pin, key, (woodruff or flat), clamp, band, bolt, or other threaded fastener and nut, springlock mechanism, blind rivet, compression rivet, thermal compound, glue, adhesive, compounds such as silicone, or temporary or removeable adhesives, interference fit, (also called press fit), locking tabs or other types of interlocking or conjoining components.

A shown in FIG. 1, in one embodiment, a method of configuring a heating box shaft 100 includes, generally, removing a gear with a shaft from a first door actuator (e.g., motor housing and motor) found in a heater box housing 102; removing a gear with a shaft from a second door actuator 104; cutting the shaft from the gear from the first door actuator 106; coupling the cut shaft to the gear and shaft from the second door actuator so as to extend the length of the shaft 108; inserting the coupled shaft and gear into the first and/or second door actuator housing 110; and inserting the coupled shaft to a door bore found on heater box 112. It will be appreciated that the gear from the second door actuator may also be used. In addition, in some embodiments, the gear with the shaft may be manufactured, machined, 3D printed, etc.

In addition, in some embodiments, the shaft could have been split somewhere around 3 or 6 mm from the base extending to the very end. Then a screw or any other fastener could be inserted into the center of the shaft as there is a small bore extending the entire length of the shaft and could cause the split shaft to expand in diameter and create a tight compressed fit between the shaft and bore. In some embodiments, the shaft may have metal protrusions located the entire length of the shaft that bite into the bore to make a solid connection.

In some embodiments, a gear assembly with the shaft may be injection molded, molded from plastic resin, or any other manufacturing process. Any other device may be envisioned to strengthen the door to resolve any heater box issues, or any other modification of the heater door or entire assembly.

In one embodiment, a heater box repair apparatus comprises a sleeve made from any type of plastic, metal, or other materials that could be made to fit over the shaft and engage the bore. A similar sleeve could be made to slide into the bore to re-form it into a usable shape. The sleeve could be a slide in or a press fit and could require re-tooling or re-shaping the bore to fit it. The sleeve could attach or join to the bore by any of the means listed above mechanical or otherwise. The sleeve could be made to expand as the shaft is inserted so as to create a tight fit. A sleeve or other type of attachment could be made to attach to the shaft on the original part with no modification of the shaft. The sleeve could attach to the original shaft by any means listed above. It will be understood that other minor or major modifications necessary to attach the sleeve to the shaft may be considered. Ultimately, it will be appreciated that the sleeve would allow for proper engagement between the shaft and the bore.

In one embodiment, a heater box repair apparatus comprises a gear that may be provided that matches the original design. However, a shaft protruding from that gear would be different from the original design. That is, a gear shaft assembly would replace the gear assembly in the original heater actuator. Case halves of the heater actuator may be separated and the original gear shaft assembly would be removed and replaced with the gear shaft assembly. In some embodiments, a hole is drilled into the heater door actuator and allows access to the small bore located in the center of the gear shaft assembly to insert a screw or other fastener.

In one embodiment, a heater box repair apparatus comprises a sleeve of metal, or other materials, the same diameter as the heater door hexagonal shaft bore protrusion (outside diameter) that is pressed onto the end of the heater door, which keeps the bore from cracking and expanding leading to the failure. The sleeve, or band, may be a thin gauge metal or similar material and press on or be heated and slide on or be attached by any type of fastener. It will be appreciated that the sleeve could be adjustable or fixed or be shaped with cutouts to match the other planes or surfaces of the door. In some embodiments, the sleeve may be about 13 mm approximate diameter (ID). The sleeve may be added to and compliment the extended shaft and gear. The door could be modified through heating or other means to accommodate the sleeve. The sleeve could be a partial circle. It could have a hexagonal shape that slips in the bore and the round part folds over the lip of the bore so as to provide strength. In some embodiments, an adhesive may be used for coupling, such as glue. In an alternate embodiment, the sleeve could be made from plastic that shrinks under heat so that the sleeve/band would slide on and be heated with a heat gun and shrink down to form tightly over the shaft on the heater door.

In one embodiment, a heater box repair apparatus may comprise a plate that would be formed to fit into a cavity on a heater box. The plate, in some embodiments, would be about 29.8 mm by about 52.8 mm with one rounded corner and two inversely rounded corners to match the exact shape of the cavity in the heater box, a different shape with no inverse corners, or any other shape. The plate would be about 4 mm to 8 mm thick and made out of, for example, aluminum, steel, or plastic. In the rounded corner would be an approximately 13.15 mm hole that would slide over the very end of the bore of the heater door that protrudes out of the box. This plate can be configured in such a manner that it would fit tightly in the cavity of the heater box and fit tightly over the bore that protrudes out of the box. It fits tightly over that bore to hold it in place and prevent the open end of the bore to flex and crack. It would maintain the original circumference of the bore to strengthen the bore and severely lessen the chance of a crack forming. The heater door would still rotate freely within this hole. This plate may be attached through mechanical means, such as rivets, screws, glue, or any other fastening mechanism. The plate is also secured in place as it fits in a cavity in the heater box between the door actuator and the heater box so it cannot move. The plate can be thicker and extend above the mounting plane or surface of the door actuator and be held in place by the clamping force of the door actuator as it is attached to the box. When viewing the cavity, a user may see the rounded corner, the two inversely rounded corners, and the 90 corner. One wall of that cavity may be about 6.3 mm the other is about 4 mm high. Further, the plate may be manufactured in a machine shop, injection molded, or designed by any other means. The plate can be any shape or size. In some embodiments, it may be used with the extended shaft. The plate, a similar apparatus, bracket, or device can be attached to the heater box by any means or attached to the vehicle dashboard, frame, etc. in such a way that a portion of that apparatus engages the bore of the door and can hold the door in any position.

It will be appreciated that the heater box repair apparatus and method allow a user to effectively address heater box issues while keeping costs down and decreasing labor time.

As shown in FIGS. 2-6, in one embodiment, a heater box apparatus 200 (FIG. 6) includes a gear member 202 and a shaft member 204. The gear member 202 may be circular in shape and comprise a first, circular member 206 having a plurality of gear teeth 208. A disc panel 210 may be positioned within the first member 206, the disc panel 210 being perpendicular to the first member 206. On a first side 212 of the disc panel 210, there may be one or more tiered first protrusions. Accordingly, a first protrusion 214 may extend from the first side 212 of the disc panel 210. Extending from the first protrusion 214 may be a second protrusion 216 that may be smaller in diameter than the first protrusion 214 and cylindrically shaped. The second protrusion 216 may comprise a first aperture 218 that passes from the first side 212 to a second side 220 of the disc panel 210. On the second side 220 of the disc panel 210, a third, shaft protrusion 222 may extend therefrom that may be larger in diameter than the second protrusion 216. The third protrusion 222 may comprise a second aperture 224. The second aperture 224 may contact and interact with the first aperture 218, and the second aperture 224 may be larger in diameter than the first aperture 218. The second aperture 224 may be hexagonal shaped. Other shapes for the second aperture 224 may include circular, rectangular, octagonal, etc. shapes.

Figure 7:
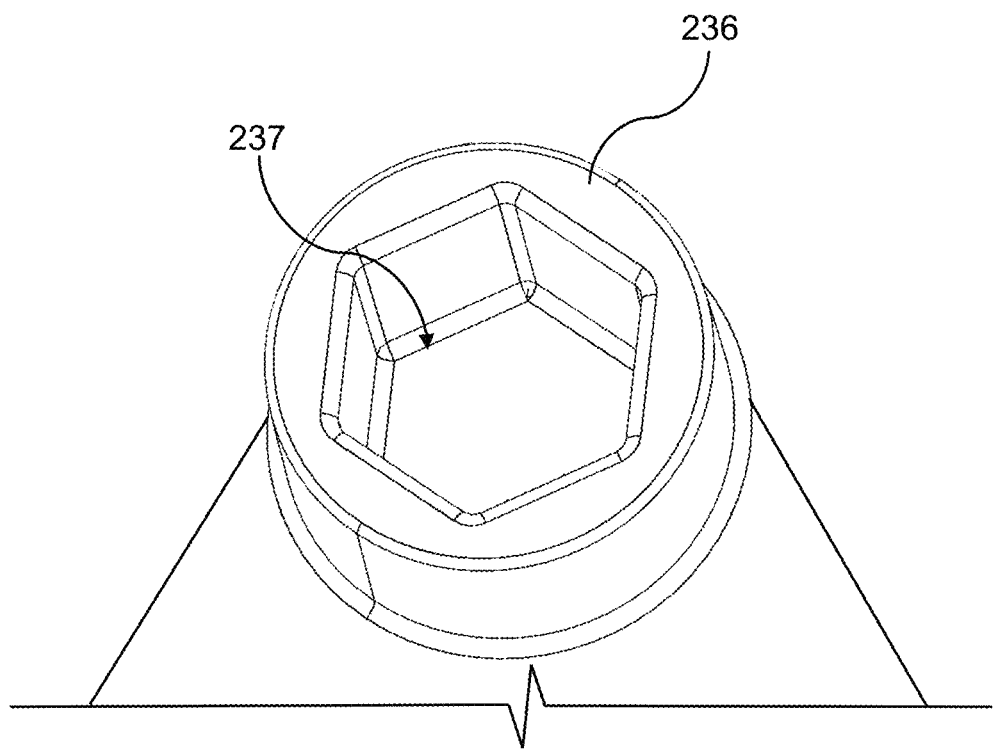
FIG. 7 illustrates a front perspective view of a door bore.
Figure 8:
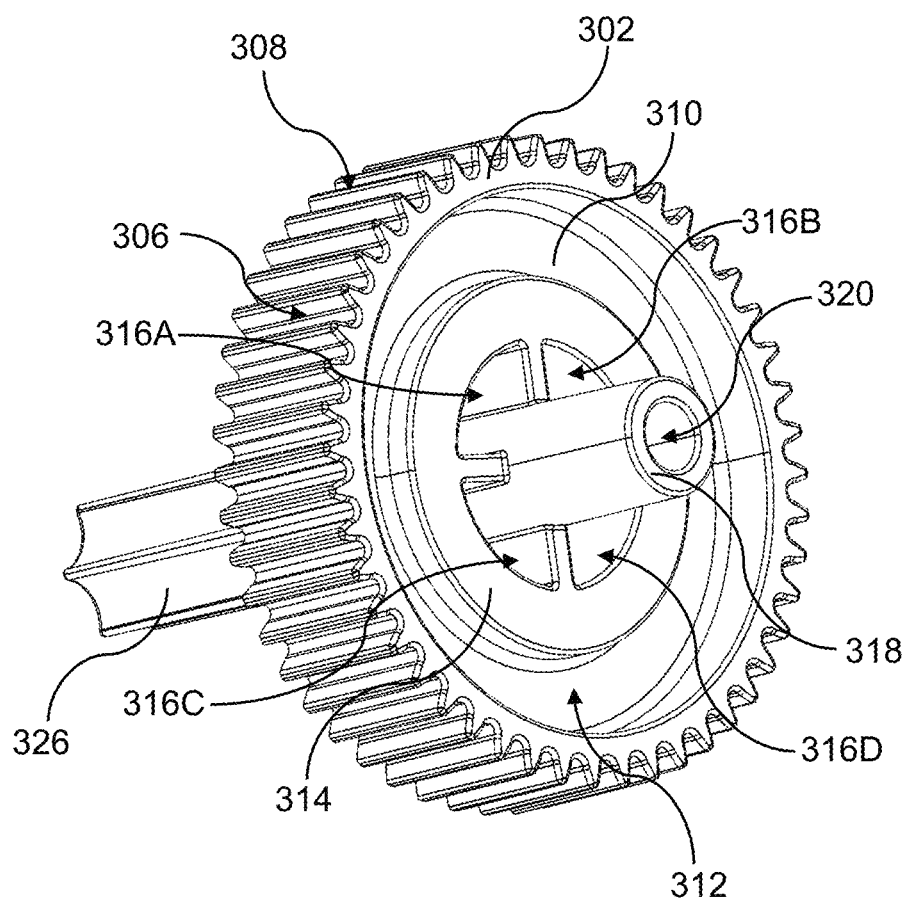
FIG. 8 illustrates a front, side perspective view of a gear member of a heater box repair apparatus.
Figure 9:
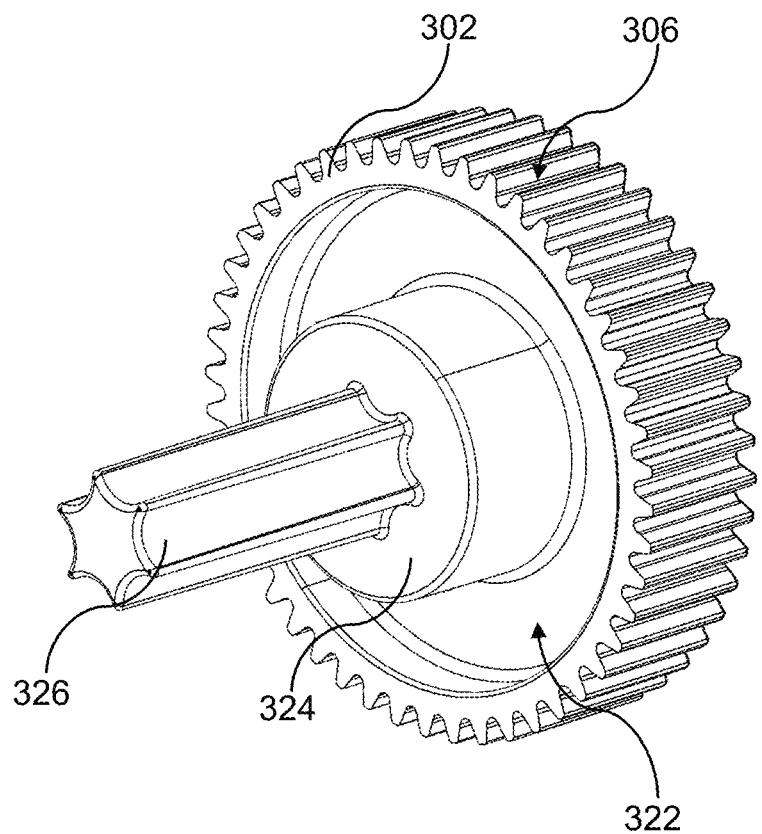
FIG. 9 illustrates a rear perspective view of a gear member of a heater box repair apparatus.
Figure 10:
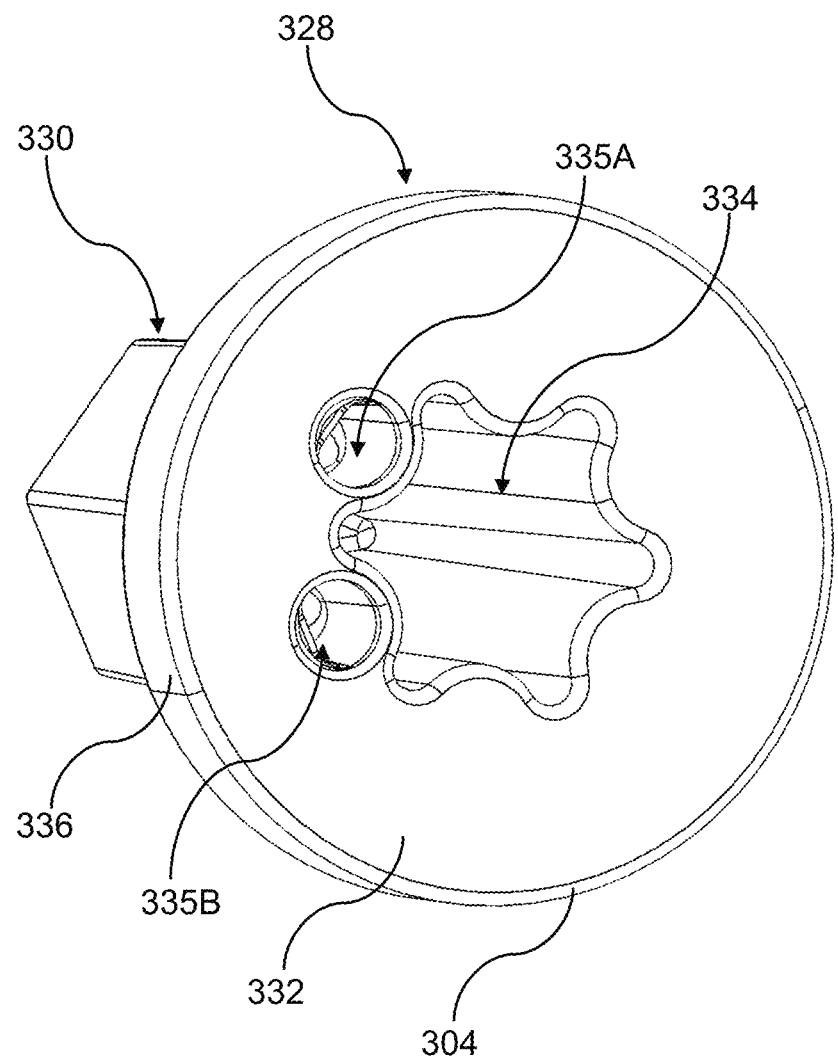
FIG. 10 illustrates a front, side perspective view of a shaft member of a heater box repair apparatus.
Figure 11:
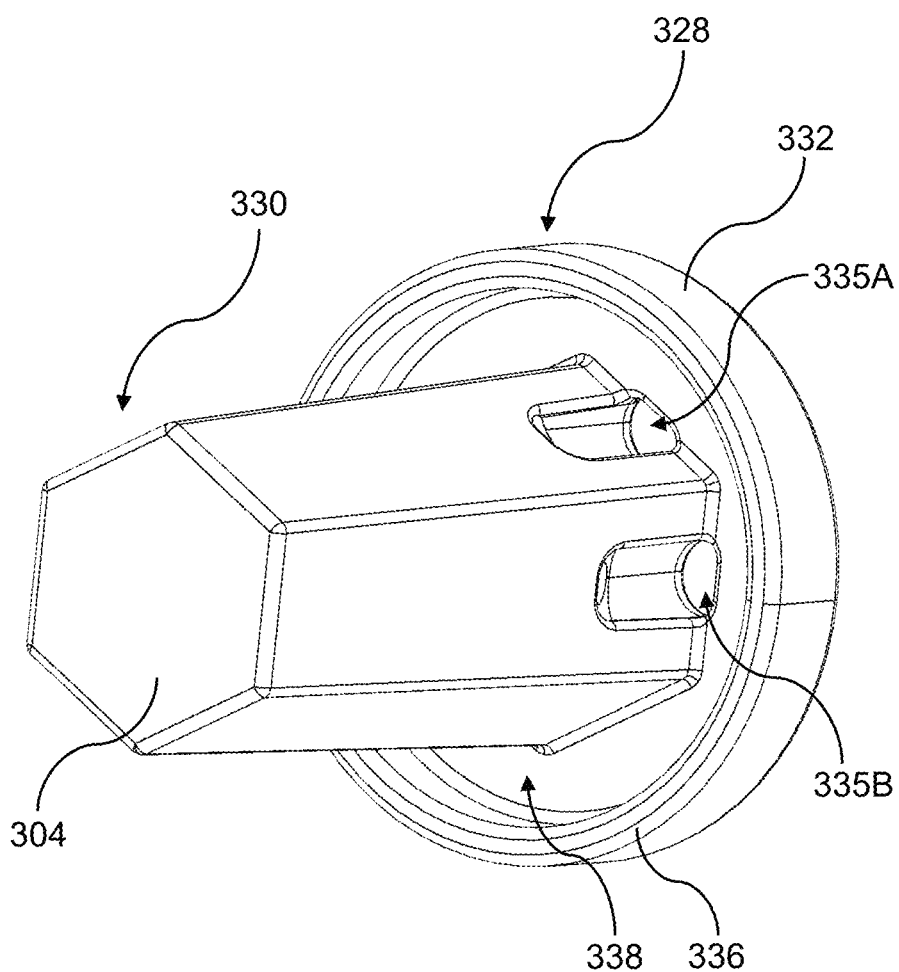
FIG. 11 illustrates a rear, side perspective view of a shaft member of a heater box repair apparatus.

The shaft member 204 may be removably attachable to the gear member 202. The shaft member 204 may comprise a first portion 226, a second portion 228, and a hood 230 that separates the first portion 226 from the second portion 228. The first portion 226 may comprise a length of the shaft member 204 that is shorter than the second portion 228 of the shaft member 204. The first portion 226 may be generally hexagonally shaped. The second portion 228 may also be generally hexagonal in shape. While the shape of the first and second portions 226, 228 is illustrated as being hexagonal in shape, it will be understood that the first and second portions 226, 228 may be numerous shapes, as well as lengths and diameters. A shaft aperture 232 may run the length of the shaft member 204, meaning it travels through the first portion 226 and the second portion 228 of the shaft member 204. The second portion 228 of the shaft member 204 may include a slight taper or decrease in diameter as the second portion 228 moves away from the hood 230. The hood 230 may also comprise a first hood aperture 234A, a second hood aperture 234B, and a third hood aperture (not shown), all of which may pass through the hood 230 and be equally spaced from each other. The hood 230 may be generally circular in shape so as to match the shape of a door bore 236 (FIG. 7). The hood 230 proximate the first portion 226 may be substantially flat, while the hood 230 proximate the second portion 228 may comprise a lip 238 that circumscribes an outer edge of the hood 230. Due to the hood 230 having a lip 238, the hood 230 generally includes a recessed portion 240 positioned between the lip 238 and the second portion 228 of the shaft member 204 that surrounds the second portion 228.

Figure 6:
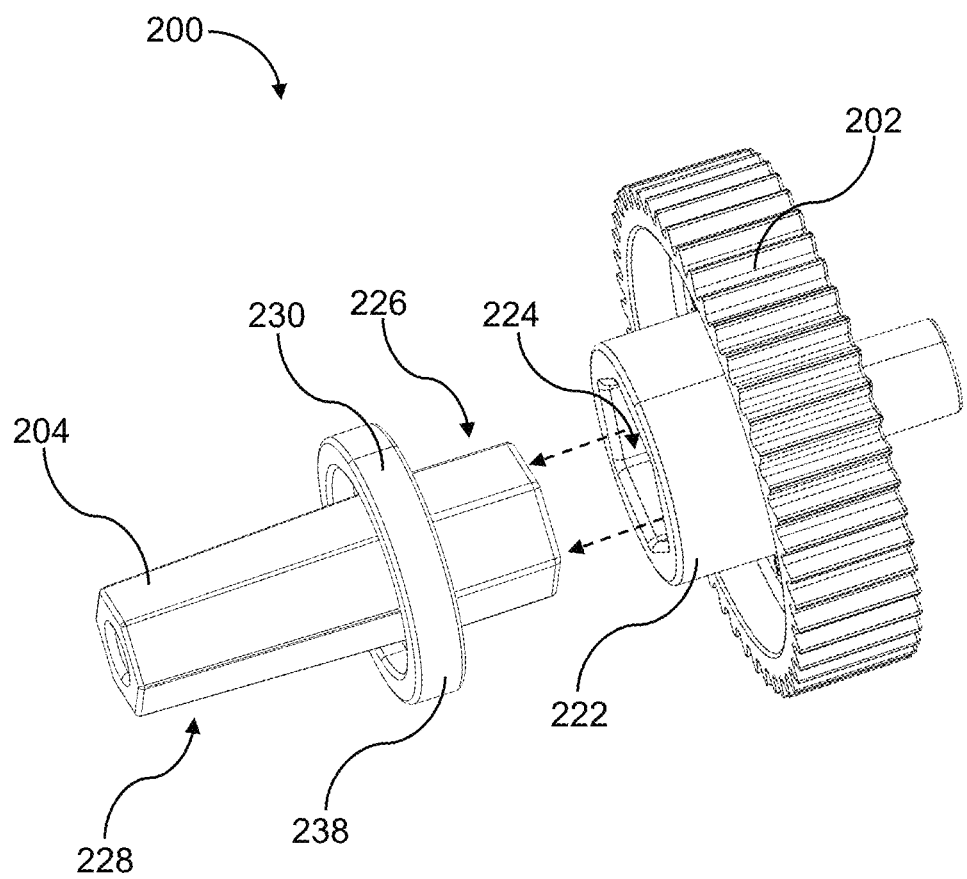
FIG. 6 illustrates a side perspective view of a heater box repair apparatus.

As shown in FIG. 6, the gear member 202 may be inserted into to the shaft member 204. In particular, the third protrusion 222 on the gear member 202 may interface with the first portion 226 of the shaft member 204, meaning the first portion 226 may be inserted into the second aperture 224 on the third protrusion 222. The shaft member 204 and the gear member 202 may be removably attachable. In some embodiments, the shaft member 204 and the gear member 202 may be secured to one another via an adhesive (e.g., glue). Other embodiments may utilize plastic welding, friction fitting, snap fit mechanisms, or any other type of securement mechanism. The gear member 202 may be installed into a door actuator. The shaft member 204 may then be affixed to the door bore 236 via, for example, an adhesive. To do that, a user may insert the second portion 228 of the shaft member 204 into a heater bore aperture 237 in the door bore 236 until the recessed portion 240 of the hood 230 contacts an outer edge of the door bore 236. It will be appreciated that the lip 238 can wrap around an outer edge of the door bore 236. If the door bore 236 were to crack, the lip on the hood 230 can act as an additional mechanism to hold the door bore 236 together, which would allow the heater in the vehicle to continue to function without replacing the unit.

As shown in FIGS. 8-12, in one embodiment, a heater box apparatus 300 (FIG. 12) includes a gear member 302 and a shaft member 304. The gear member 302 may be circular in shape and comprise a first, circular member 306 having a plurality of gear teeth 308. A disc panel 310 may be positioned within the first member 306, the disc panel 310 being perpendicular to the first member 306. On a first side 312 of the disc panel 310, there may be tiered protrusions. Accordingly, a first protrusion 314 may extend from the first side 312 of the disc panel 310. The first protrusion 314 may comprise first protrusion apertures 316A, 316B, 316C, 316D. Extending from the first protrusion 314 may be a second protrusion 318 that may be smaller in diameter than the first protrusion 314 and cylindrically shaped (other shapes may also be envisioned without departing herefrom, such as triangular). The second protrusion 318 may comprise a first aperture 320. On a second side 322 of the disc panel 310, a third protrusion 324 may extend therefrom that may be larger in diameter than the second protrusion 318. The third protrusion 324 may include a first shaft 326. The first shaft 326 may be six sided and generally star-shaped; however, the first shaft 326, in some embodiments, may be generally hexagonal in shape.

The shaft member 304 may be removably attachable to the gear member 302. The shaft member 304 may comprise a first portion 328 and a second portion 330. The first portion 328 may comprise a hood 332. A shaft receptacle 334 may run the length of the shaft member 304, meaning it travels through the first portion 328 and the second portion 330 of the shaft member 304. In some embodiments, the shaft receptacle 334 may be longer or shorter than what is illustrated. The shaft receptacle 334 may be generally star-shaped so as to receive the first shaft 326. However, it will be understood that the shaft receptacle 334 may be square-shaped, etc. to mirror any shape that the first shaft 326 may be. The hood 332 may also comprise a first hood aperture 335A and a second hood aperture 335B, both of which pass through the hood 332. The hood 332 may be generally circular in shape so as to match the shape of the door bore 236 shown in FIG. 7. The hood 332 may be substantially flat. The hood 332 may comprise a lip 336. Proximate the second portion 330, the lip 336 circumscribes an outer edge of the hood 332. Due to the hood 332 having the lip 336, the hood 332 generally includes a recessed portion 338 positioned between the lip 336 and the second portion 330 of the shaft member 304 that surrounds the second portion 330. The second portion 330 may also be generally hexagonal in shape. While the shape of the second portion 330 is illustrated as being hexagonal in shape, it will be understood that the second portion 330 may be numerous shapes, as well as lengths and diameters. The second portion 330 of the shaft member 304 may include a slight taper or decrease in diameter as the second portion 330 moves away from the hood 332 on the first portion 328. The second portion 330 may be placed in the door bore 236.

Figure 12:
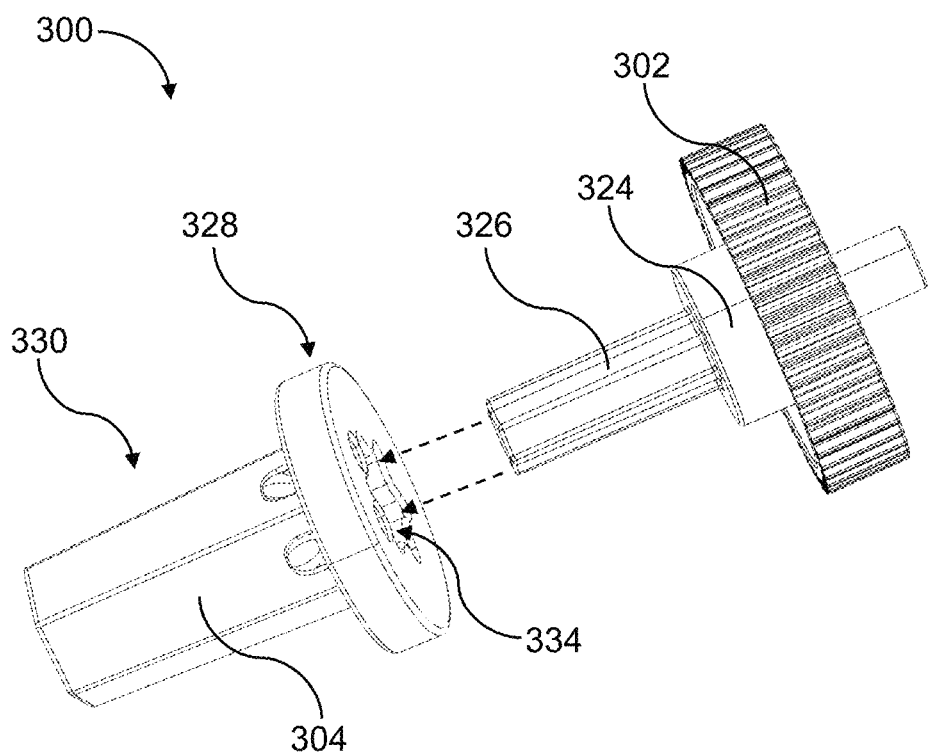
FIG. 12 illustrates a side perspective view of a heater box repair apparatus.

As shown in FIG. 12, the gear member 302 may be coupled to the shaft member 304. In particular, the first shaft 326 on the gear member 302 may interface with the shaft aperture 334 of the shaft member 304, meaning the fourth protrusion 326 may be inserted into the shaft aperture 334. In some embodiments, the shaft member 304 and the gear member 302 may be secured to one another via an adhesive (e.g., glue). Other embodiments may utilize plastic welding, friction fitting, snap fit mechanisms, or any other type of securement mechanism. The gear member 302 may be installed into a door actuator. The shaft member 304 may then be affixed to the door bore 236 via, for example, an adhesive. To do that, a user may insert the second portion 330 of the shaft member 304 into a heater bore aperture 237 in the door bore 236 until the recessed portion 338 of the hood 332 contacts an outer edge of the door bore 236. It will be appreciated that the lip 336 can wrap around an outer edge of the door bore 236. If the door bore 236 were to crack, as discussed above, the lip 336 on the hood 332 can act as an additional mechanism to hold the heat box bore 236 together, which would allow the heater in the vehicle to continue to function without replacing the unit.

Figure 13:
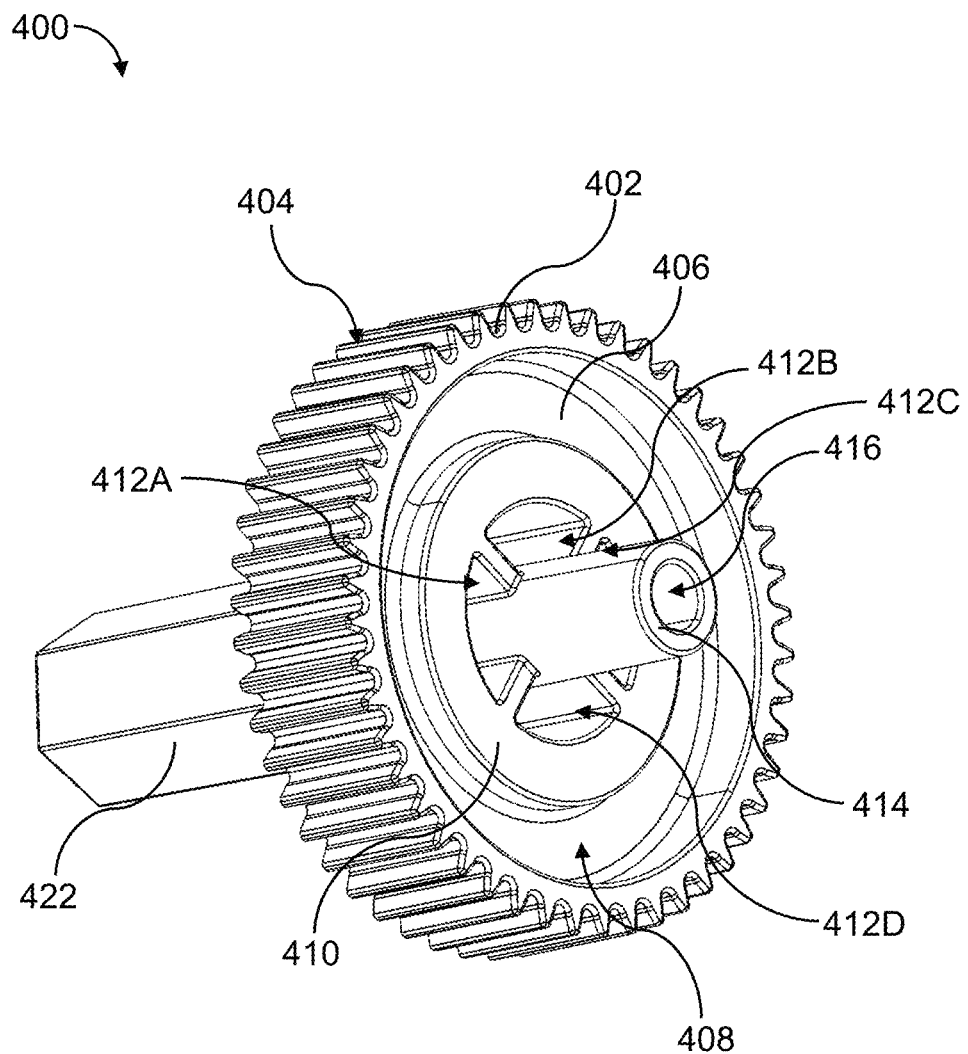
FIG. 13 illustrates a front, side perspective view of a gear member of a heater box repair apparatus.
Figure 14:
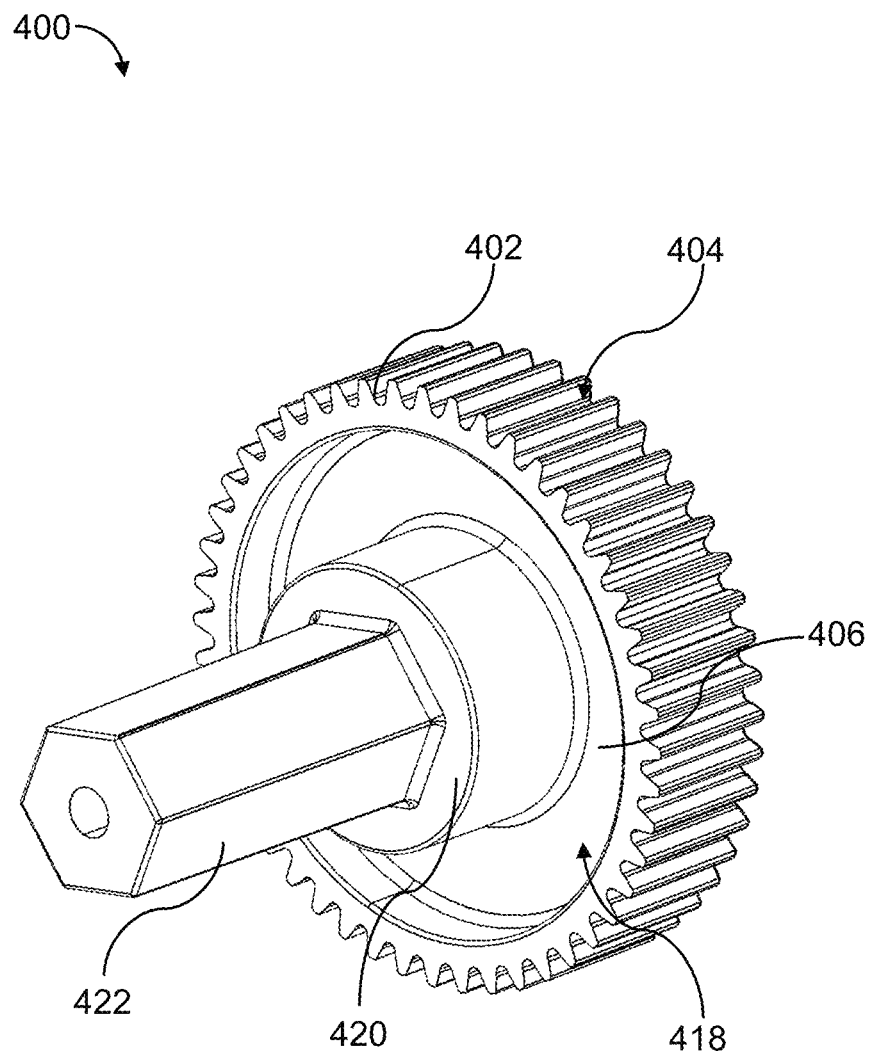
FIG. 14 illustrates a rear perspective view of a gear member of a heater box repair apparatus.
Figure 15:
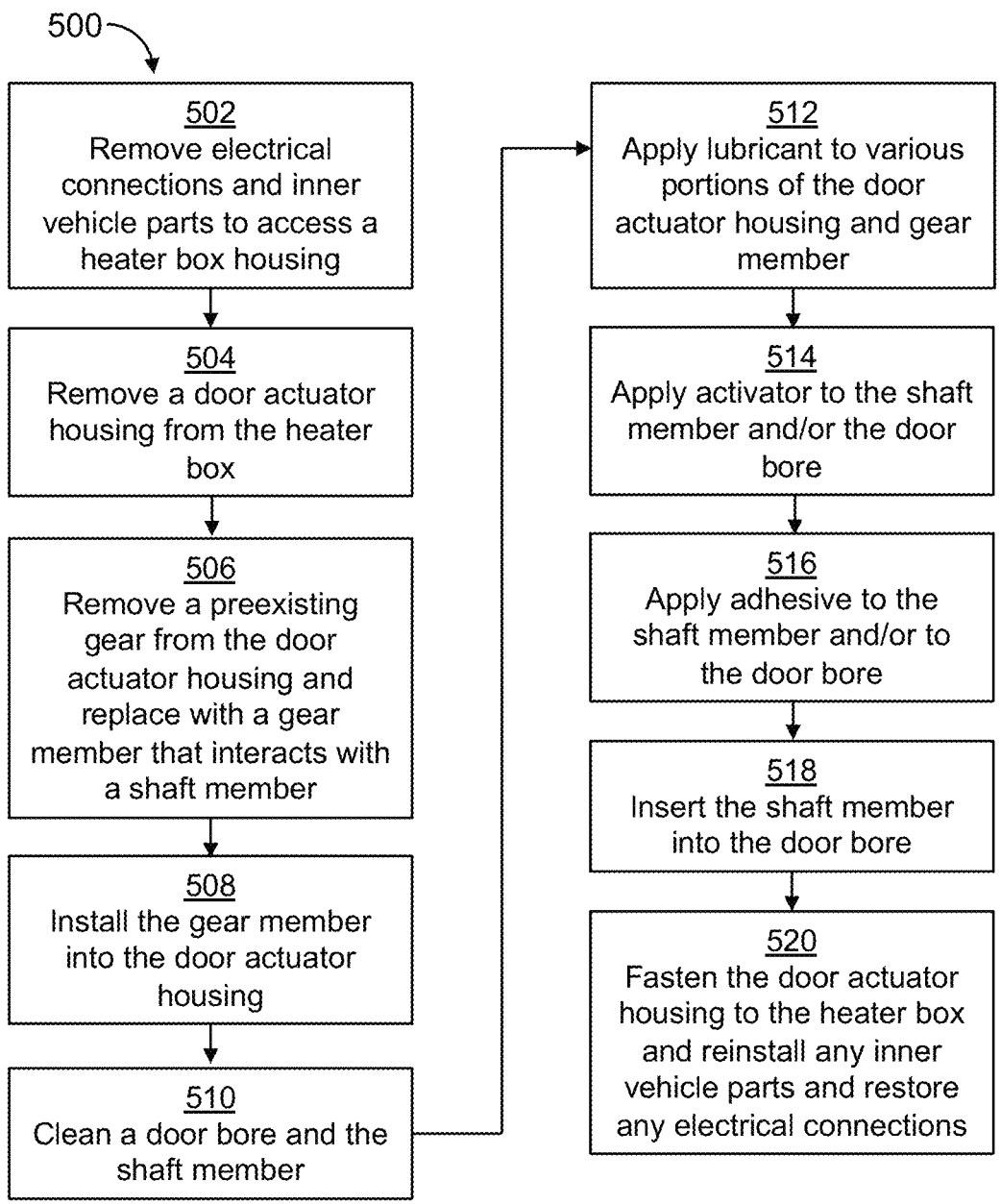
FIG. 15 illustrates a flow chart of a heater box repair apparatus and method of use.
Figure 16:
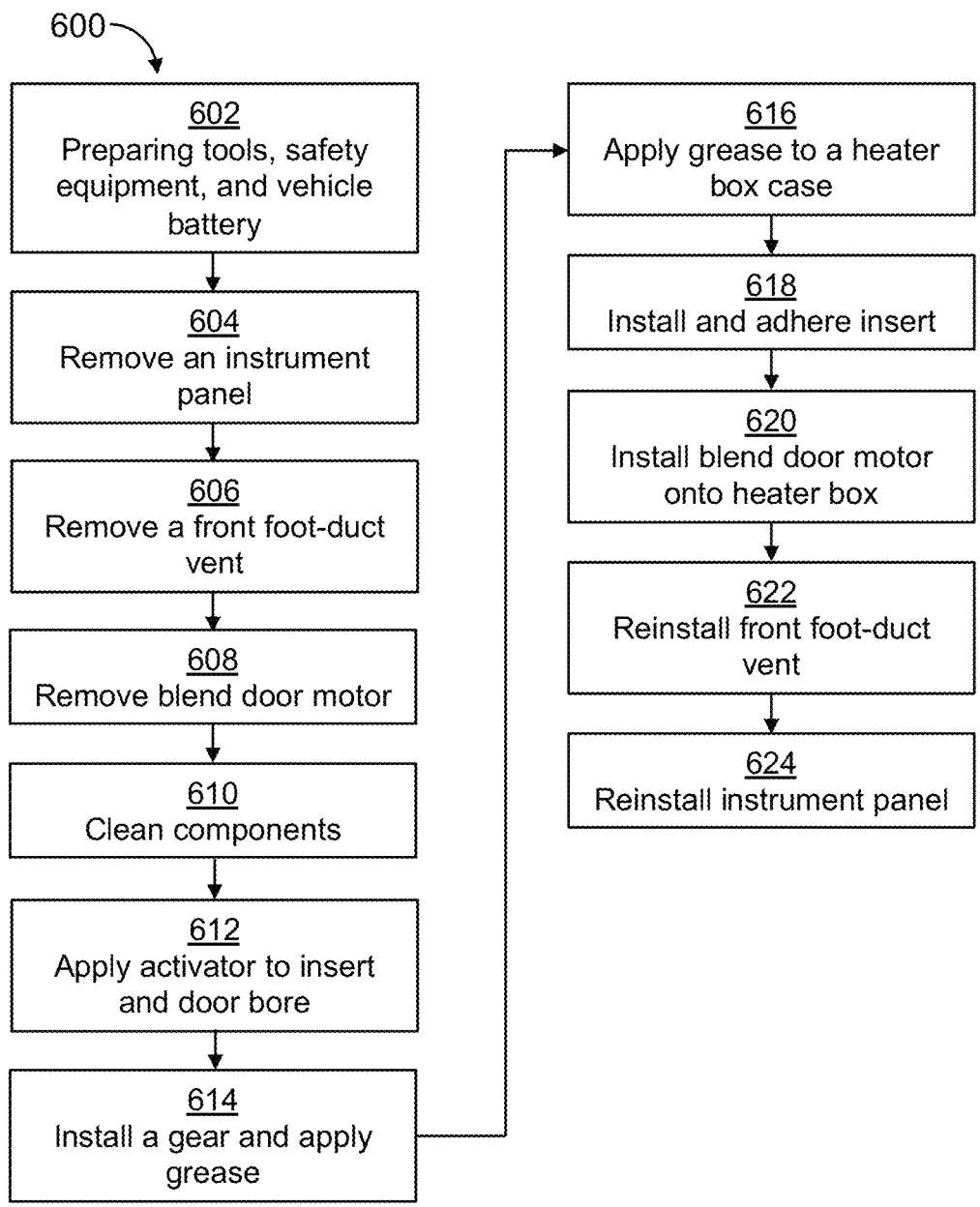
FIG. 16 illustrates a flow chart of a heater box repair apparatus and method of use.

In one embodiment, as shown in FIGS. 13-14, a gear member 400 may be circular in shape and comprise a first, circular member 402 having a plurality of gear teeth 404. A disc panel 406 may be positioned within the first member 402, the disc panel 406 being perpendicular to the first member 402. On a first side 408 of the disc panel 406, there may be tiered protrusions. Accordingly, a first protrusion 410 may extend from the first side 408 of the disc panel 406. The first protrusion 410 may comprise first protrusion apertures 412A, 412B, 412C, 412D. Extending from the first protrusion 410 may be a second protrusion 414 that may be smaller in diameter than the first protrusion 410 and cylindrically shaped. The second protrusion 414 may comprise a first aperture 416. On a second side 418 of the disc panel 406, a third protrusion 420 may extend therefrom that may be larger in diameter than the second protrusion 414. The third protrusion 420 may include a first shaft 422. The first shaft 422 may be a hexagonal shaft that may function with a sleeve or directly with the bore of the heater box as shown in FIG. 7. It will be appreciated that the first shaft 422 may be triangular or any other shape.

In one embodiment, a method of repairing a heater box with the heater box repair apparatus 500 includes the following steps: remove electrical connections and inner vehicle parts to access a heater box housing 502, which may, in some embodiments, include relocating an instrument panel, unplugging electrical connectors on the lower instrument panel and remove panel, removing a center console side finisher, removing a front foot duct vent by removing one or more screws and utilizing a first tool (e.g., 90-Degree pick) to unfasten the front foot duct from the heater box of the repair vehicle and removing the left-hand air mix door motor by first removing one or more attachment screws and unsecure an electrical retaining tab, removing a first connector; remove a door actuator (e.g., motor housing and motor therein) from a heater box and, in some embodiments, separate the two halves of the door actuator 504 (e.g., break small instruments, such as toothpicks in half, and slide them under retaining tabs of the housing and prying with a screwdriver until separation); remove a preexisting gear with a shaft from the motor and discard and replace with a gear member 202, 302, 400 that interacts with a shaft member 204, 304, applying a predetermined amount of lubricant (e.g., non-degrading grease) to the gear member, such as on a plurality of gear teeth, tiered protrusions, a third protrusion, and one or more portions of the door actuator housing 506; install the gear member 202, 302, 400 into the door actuator housing and ensure all parts are in the door actuator housing and reconnect the door actuator housing 508; clean a door bore 236 (such as by taking a provided cotton ball and separating it into multiple pieces and using tweezers to wipe the door bore 236, the cotton ball may be saturated with a cleaner), clean shaft member 204, 304, and temporarily place shaft member 204, 304 into door bore 236 so that the fit is snug and the depth of insertion is correct for test fitting, shaft member 204, 304 should contact a face of the heater box 510; apply lubricant to various portions of the door actuator housing, any components therein and/or to portions of the door bore and gear member 202, 302, 400 to prevent any adhesive from adhering 512; using an activator (i.e., chemical, compound, agent, accelerator, catalyst, catalyzing agent, sealant, etc. to increase bonding adhesion), the user may then apply an amount of activator to the shaft member and/or the door bore (Activator may be placed thereon, for example, with a cotton ball and tweezers, or another applicator) at step 514; assemble a needle onto a syringe, provided in the kit, and/or add an adhesive (e.g., gel adhesive), such as 0.5 ml, to, for example, the shaft member 204, 304, and add the adhesive to the door bore 236 and spread adhesive using a tool (e.g., a clean screwdriver) 516; insert the shaft member 204, 304 into the door bore 236 and clean excessive adhesive 518, allowing curing time; fasten the door actuator to the heater box housing and reinstall any vehicle parts and re-establish any electrical connection, such as fasteners, the center console side finisher, the instrument lower panel, electrical connectors, and the battery, and test the vehicle to verify function of heater and AC 520.

In some embodiments, if there are cracks in the heater box that are large, then a user may rotate the door bore so that the cracks are not on the bottom thereof. A user may then apply the adhesive to the cracks with the tool (e.g., screwdriver) and remove any excess.

In some embodiments, a heater apparatus may include, or at least interact, with a slip clutch, decoupling device, whether they are electrical, hydraulic, spring loaded, or spring tensioned, or tensioned in any other manner. There may also be modifications or additions to the gearbox, gear, door, door shaft, heater box or any connection between any of those parts. Furthermore, the materials used herein may be manufactured from plastic, rubber, metal, cloth, paper, wood, etc. to create a semi solid, semi rigid, or non-fixed slip connection between a drive gearbox and a door. The heater box apparatus may include adhesives, chemicals, lubricants, compounds, modifiers that are configured to assist in the connection of the heater box apparatus.

In some embodiments, a heater box apparatus may include torque reducing measures, which may include gear multiplying, gear overdriving, electrical modifications, or software edits. In some embodiments, the gearbox may be substituted for another or the whole heater box may be replaced. In some embodiments, the door actuator may be configured to limit its mechanical travel to prevent damage, for example, by modifying the electrical components or gear teeth so as to limit rotational travel of the shaft.

It will be appreciated that many materials may be used to ensure and secure the connection between the heater box and the motor. It will further be appreciated that there may be other materials, methods, configurations to secure the air mix door motor to the heater box used without departing herefrom. Any material listed above or otherwise may be used for the purpose of securing the connection between the heater box and the motor.

In some embodiments, the heater box repair apparatus may include a motor that is cable operated and may be manipulated manually (e.g., by hand). In some embodiments, the heater box apparatus may be cut or modified in numerous ways for the purpose of manually adjusting heat, air recirculation, etc., whether in dual zone cars or single zone cars. Dual-zone climate control allows both a driver and a passenger to adjust their own temperature while single zone temperature adjustments affect the driver and passenger equally.

In one embodiment, a method of repairing a heater box with the heater box repair apparatus 600 includes the following steps: at step 602, preparing tools, safety equipment and vehicle battery by using safety equipment including, but not limited to: safety glasses, gloves, protective clothing, etc.; following all safety guidelines on any chemicals or products provided; laying out supplies provided in the repair kit to ensure no parts are missing; ensuring the work area is clean, and safe; and disconnecting the battery negative cable from the battery; at step 604, removing an instrument panel side finisher by prying out to release the retaining clips; removing a center console side finisher; pulling straight out to release the retaining clips, removing instrument lower panel: remove bolts at hood release cable, remove OBD connector and accessory connector (if present) at release tabs using a suitable tool (e.g., A tool such as a 90-degree pick may be used to unfasten the vent after the screws are removed. The vent can also be rotated and removed), pull out on panel to release clips, disconnect electrical harness connectors via release tabs; at step 606, removing a front foot-duct vent by removing fasteners; at step 608, removing blend door motor by removing fasteners to unfasten blend door motor from heater box and disconnecting electrical connector by prying against release tab using a tool (e.g., a small flat blade screwdriver); at step 610, cleaning components by breaking, for example, a cotton ball into two or more equal pieces, wiping a door bore with the cotton ball and tweezers, spraying cleaner on the cotton balls and using the cotton balls to scrub the door boor, repeating until cotton balls come out clean, allowing door bore to dry thoroughly, cleaning an insert/shaft using cleaner and cotton balls, allowing insert/shaft member to dry thoroughly, using a hair dryer, or compressed air, to dry door bore and insert for a period of time (e.g., one minute), and testing the fit of the insert into door bore of heater box, ensuring insert goes in far enough to contact heater box; at step 612, applying an activator to insert and door bore by unscrewing a cap from activator vial, ensuring activator cotton in the vial is damp, wetting a cotton swab in activator vial by compressing cotton wad inside activator vial, wiping the cotton swab inside neck of vial to remove any free liquid, coating activator evenly inside door bore with swab, wiping activator onto outside lip of door boor with the swab, wiping activator onto longer hex shaft (or any other shape of shaft) of insert, allowing all parts to dry for a period of time (e.g., 5 minutes) before proceeding, and ensuring that insert is installed within installation time (i.e., after at least 5 minutes, but within 15 minutes of activator application); at step 614, installing a gear and applying grease by first separating a blend door by sliding screwdriver under the center of one tab of blend door motor until it stops, rotating screwdriver 90 degrees so tab is elevated from case of blend door motor, inserting a toothpick, or other insert, next to screwdriver and under tab just far enough to hold it up without letting tab rebound or pushing up further, removing screwdriver, repeating process for other tabs on blend door motor, wedging screwdriver between the two case halves of blend door motor to separate them, removing and discard factory gear, applying a light coating of grease to the new, second gear, applying grease to gear teeth, outside of both hubs, and disk panel at the base of hubs, applying grease to case halves of blend door if dry, inserting new gear and rejoining case halves by pressing together; at step 616, applying grease to a heater box case by placing it around, and up to, outside of door bore with a cotton swab; at step 618, installing and adhering insert by ensuring shorter hex shaft (or any other shape of shaft) on insert slides completely into new gear without stopping, installing insert into heater box using the following steps: soaking a rag in cleaner, assembling a glue needle onto a 1 milliliter (ml) syringe, removing syringe plunger by pulling it out, filling syringe to about 0.6 ml line or more while wearing rubber gloves, inserting plunger and hold syringe at about a 45-degree angle, pushing plunger to remove any trapped air, and bringing adhesive level (or other types of fasteners) to, for example, 0.5 ml, replacing or cleaning gloves and/or syringe if glue gets thereon, adding about 0.3 ml (in some embodiments, exactly 0.3 ml) of adhesive inside door bore with syringe, spreading adhesive evenly inside door bore, cleaning any adhesive remnants on heater box case and regreasing, applying a light, even coat of adhesive (0.1 ml or less) around longer hex (or any other shape) portion of insert, adding less than half of a 0.1 ml measurement to the end of longer side of insert including in center vent hole, installing insert into door bore, waiting one or more minutes for adhesive to start setting, wiping up any excess adhesive from heater box or insert, including center vent hole of insert, with the cleaner-soaked rag, waiting one or more minutes, rotating heater door by turning insert back and forth to ensure that it moves freely, allowing adhesive to cure for a minimum of 24 hours before vehicle is assembled further; at step 620, installing blend door motor onto heater box by performing the following: grasping installed insert and rotate heater door by hand, installing blend door motor onto heater box, installing fasteners; at step 622, reinstalling front foot-duct vent and fasteners; at step 624, reinstalling instrument lower panel and both side finishers, reconnecting electrical connectors onto instrument lower panel, snapping the OBD connector into place and also accessory connector (if present), lining up clips and pushing panel into place, reinstalling the two bolts into hood release lever at bottom of lower instrument panel, reinstalling center console and instrument panel side finishers by lining up clips and pushing them into place, reconnecting battery and operating vehicle to verify correct operation.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

What is claimed is:

1. A method of repairing a vehicle heater box using a heater box repair apparatus, the method comprising:
   accessing a heater box housing in the vehicle;
   removing a door actuator housing from the heater box housing;
   removing a preexisting gear from within the door actuator housing;
   replacing the preexisting gear with a gear member;
   inserting a shaft member into a door bore; and
   reinstalling the door actuator housing onto the heater box housing of the vehicle.

2. The method of claim 1, wherein the gear member comprises a first member, a disc panel, one or more first protrusions, and a shaft protrusion.

3. The method of claim 2, wherein the one or more first protrusions are positioned on a first side of the disc panel.

4. The method of claim 2, wherein the shaft protrusion is positioned on a second side of the disc panel.

5. The method of claim 1, wherein the shaft member comprises a first portion and a second portion.

6. The method of claim 5, wherein the first portion and the second portion are separated by a hood.

7. The method of claim 6, wherein the hood comprises a lip that circumscribes an outer edge of the hood.

8. The method of claim 5, wherein the first portion of the shaft member is shorter in length than the second portion of the shaft member.

9. The method of claim 2, wherein the first member comprises a plurality of gear teeth.

10. The method of claim 1, wherein the shaft member is shaped to mate with an aperture on the gear member and the door bore on the heater box in the vehicle.

11. The method of claim 1, further comprising cleaning the door bore and the shaft member.

12. The method of claim 1, further comprising applying an activator to the shaft member and the door bore.

13. A method of repairing a vehicle heater box using a heater box repair apparatus, the method comprising:
    accessing a heater box housing in the vehicle;
    removing a door actuator housing from the heater box housing;
    removing a preexisting gear from within the door actuator housing;
    replacing the preexisting gear with a gear member, the gear member comprising:
      a first member;
      a disc panel where the first member couples to and defines an outer edge of the disc panel, the disc panel comprising a first side and a second side;
      one or more first protrusions on the first side of the disc panel;
      a shaft protrusion on the second side of the disc panel; and
      an aperture on the shaft protrusion;
    inserting a shaft member into a door bore, the shaft member interacts with the gear member, the shaft member comprising a first portion, a second portion, and a hood that separates the first portion from the second portion; and
    reinstalling the door actuator housing onto the heater box housing of the vehicle.

14. The method of claim 13, further comprising cleaning the door bore and the shaft member.

15. The method of claim 13, further comprising applying an activator to the shaft member and the door bore.

16. The method of claim 13, wherein the first member comprises a plurality of gear teeth.

17. The method of claim 13, wherein the shaft member is shaped to mate with the gear member and the door bore on the heater box in the vehicle.

18. The method of claim 13, further comprising applying grease to the gear member.

19. A method of repairing a vehicle heater box using a heater box repair apparatus, the method comprising:
    preparing tools, safety equipment, and a vehicle battery;
    accessing a heater box housing in the vehicle;
    removing a door actuator housing from the heater box housing;
    removing a preexisting gear from the door actuator housing;
    replacing the preexisting gear with a gear member;
    cleaning a door bore and a shaft member;
    applying an activator to the shaft member and the door bore;
    applying adhesive into the door bore;
    inserting the shaft member into the door bore, the shaft member interacts with the gear member; and
    reinstalling the door actuator housing onto the heater box housing of the vehicle.

* * * * *